Dec. 4, 1945. J. P. RATAY 2,390,171
TUBE MACHINE
Filed May 2, 1942 3 Sheets-Sheet 2
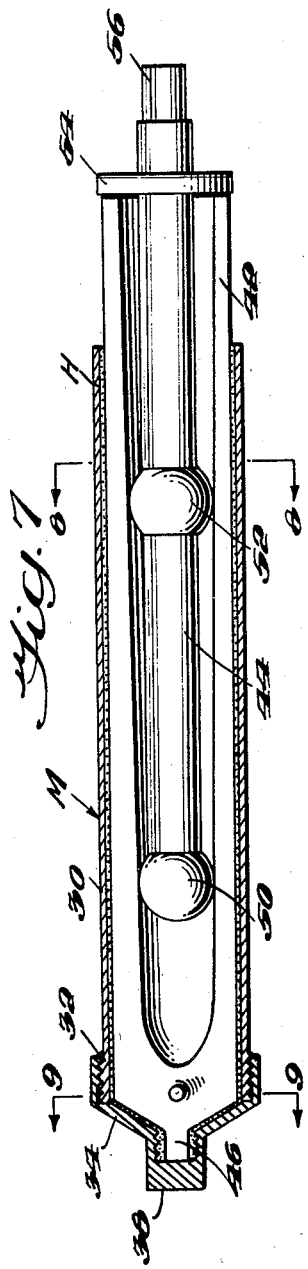
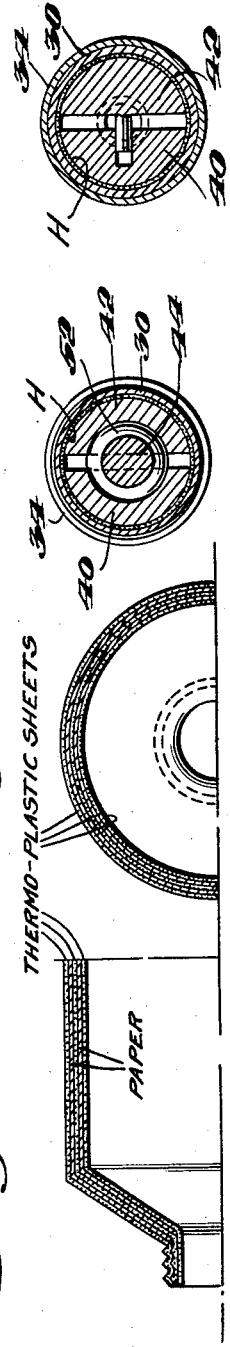
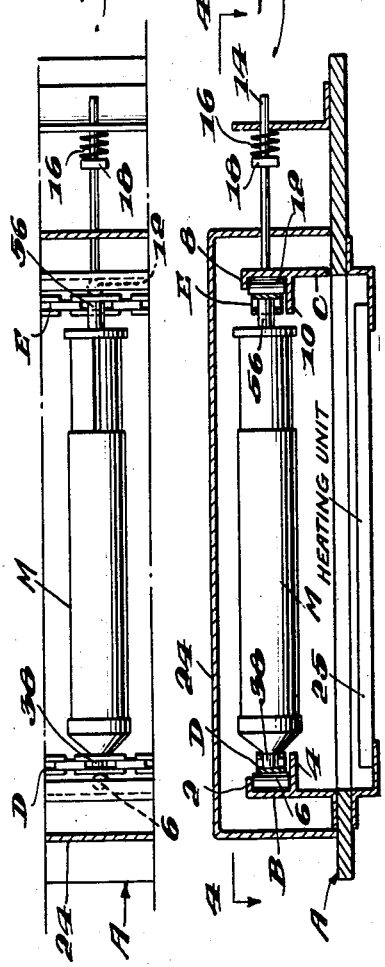
Inventor
JOHN PAUL RATAY,
By Bailey, Stephenson & Huettig
Attorneys

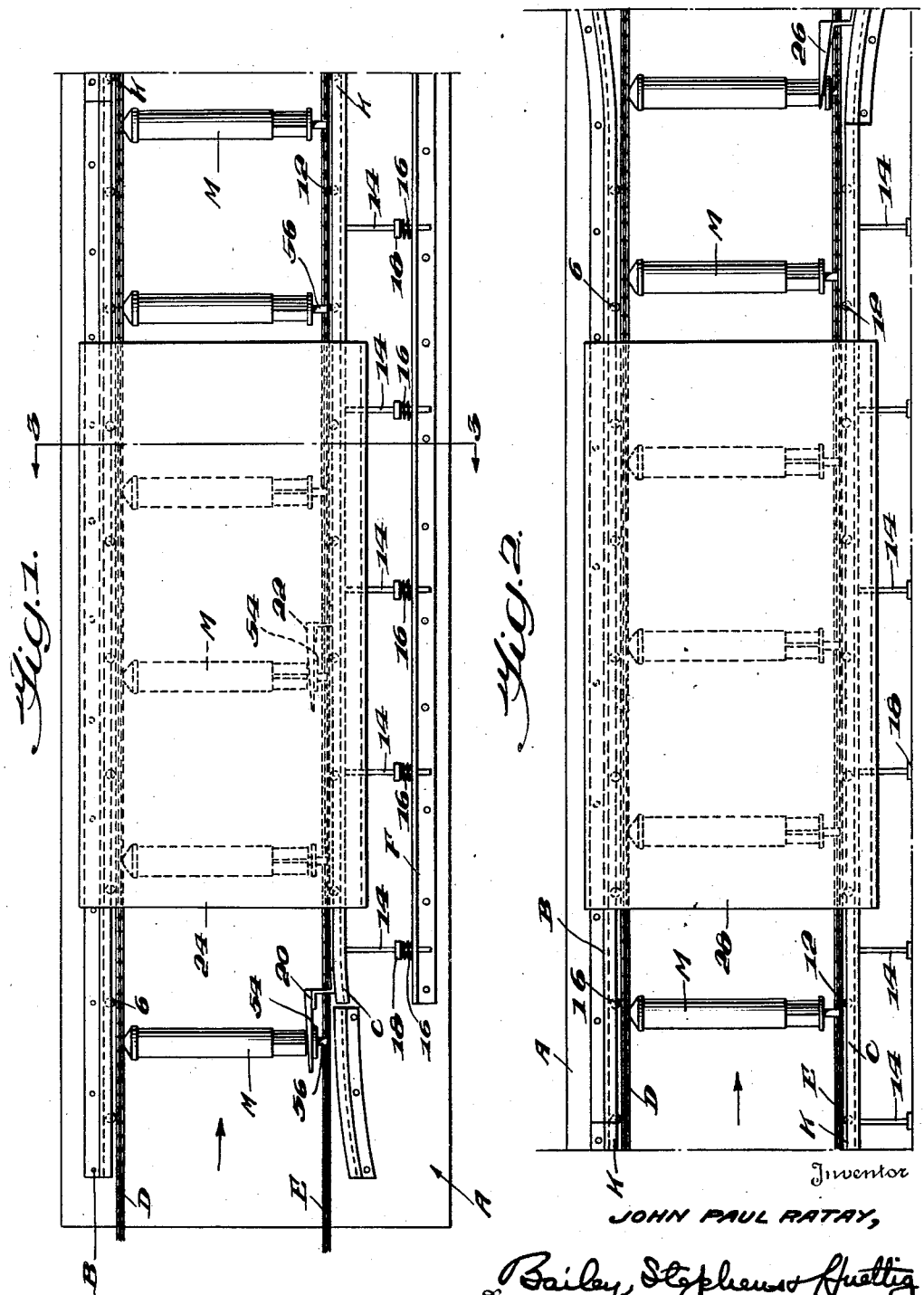

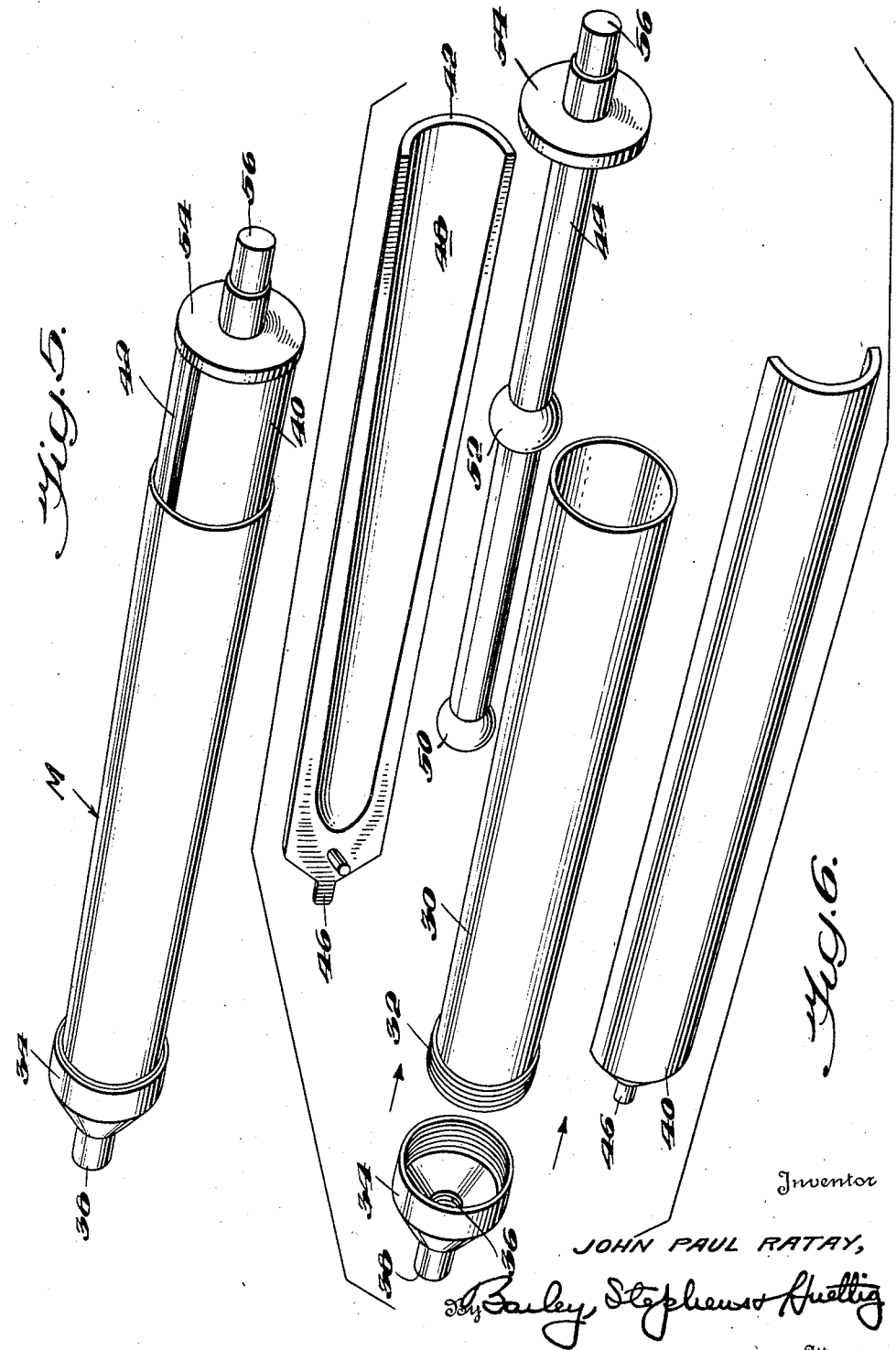

Patented Dec. 4, 1945

2,390,171

UNITED STATES PATENT OFFICE 2,390,171

TUBE MACHINE

John Paul Ratay, Washington, D. C.

Application May 2, 1942, Serial No. 441,487

9 Claims. (Cl. 154—1)

This invention relates to a tube making machine. In particular, the invention is directed to a machine for making tubes of cellulosic or other thermoplastic material.

In my United States Patent No. 2,176,109 I have disclosed a tube composed of layers of cellulosic material reënforced with paper and/or metal foil and adapted to serve as a container for tooth paste, cosmetics and the like. In making these tubes heat and pressure are necessary to mold the layers of material into an integral structure. Prior known machines for forming the tubes have not been entirely satisfactory because of the expense of construction and the wear of the parts by heat and pressures, the cost of manufacturing the tubes being increased thereby.

It is an object of this invention to construct a machine for making tubes of thermoplastic material which is less expensive to build and operate than machines for making tubes of metal.

Another object of this invention is to construct a machine for making tubes of thermoplastic material in which pressures great enough to produce a high polish on the tubes are obtained without subjecting the machine parts to undue wear.

Another object of the invention is to construct a machine for making tubes of laminated cellulosic or other thermoplastic material which is substantially automatic in operation and forms the tubes in a few simple steps.

These and other objects of the invention may be more fully understood with reference to the accompanying drawings, in which:

Figs. 1 and 2 are plan views of my machine, Fig. 2 being a continuation of Fig. 1;

Fig. 3 is a cross-sectional view on the line 3—3 of Fig. 1;

Fig. 4 is a cross-sectional view on the line 4—4 of Fig. 3;

Fig. 5 is a perspective view of the mold element used in the machine;

Fig. 6 is an exploded view of the mold element;

Fig. 7 is a longitudinal, cross-sectional view through the mold element;

Fig. 8 is a cross-sectional view on the line 8—8 of Fig. 7;

Fig. 9 is a cross-sectional view on the line 9—9 of Fig. 7; and

Figs. 10 and 11 are partial, cross-sectional views through the tube which is formed by the machine.

Generally, the machine consists of a frame on which a pair of spaced, parallel, endless chains are mounted and carry removable molds through a heating and pressing operation, and then through a cooling and disassembling operation.

In Figs. 1 to 4, the frame A supports a pair of spaced rails B and C which guide a pair of chains D and E, respectively. These chains are preferably endless and pass around frame A over wheels, not shown. Each chain is made up of bar links, the facing links of chains D and E being perforated and slotted, respectively, for the reception of a mold, as will be described later.

Rail B is fixed to frame A and is provided with horizontal, spaced flanges 2 and 4 between which are mounted rollers 6. Flange 4 is extended to form a support for chain D.

Rail C movably rests on frame A and includes flanges 8 and 10, between which are mounted rollers 12. Flange 10 is extended to form a support for chain E. Because of its length, this rail is transversely flexible. Angle F, fixed to frame A, has holes therein through which pass freely rods 14 secured to rail C, the latter thus being movable transversely of angle F. Coil springs 16 are fitted over rods 14, their tension being adjusted by nuts 18 threaded to rods 14.

Rail C supports a wedge separator 20, Fig. 1, and second similar separator 22 located under a heating hood 24 and, Fig. 2, a third similar separator 26. This latter follows a cooling chamber 28. Heat is supplied to the hood 24 by any conventional means, as by electric coils 25 mounted on frame A. Similarly, refrigerating coils, or any other cooling means, are employed in conjunction with chamber 28.

Each mold M, Figs. 5 to 9, is composed of a cylinder 30, to one end 32 of which is threaded a cap 34. The interior bore 36 of this cap is threaded as a mold form, and the apex of the cap terminates in a flat end projection 38 adapted to be carried in the chain D.

A mandrel, Figs. 6 and 7, adapted to telescopically engage tube 30 and around which the material to be molded is placed, is composed of a cored rod separated into halves 40 and 42, and a plunger 44. The solid end of the mandrel terminates in a projection 46 adapted to enter into molding engagement with cap 34. The core 48 within the mandrel is of conical shape.

Plunger 44 is provided with a plurality of spherical enlargements 50, 52, which are tangent to the conical surface of core 48 but which are of greater diameter than the minimum sectional diameters of the core. Thus as plunger 44 is pressed into core 48, the wedging action of enlargements 50, 52 will separate halves 40 and 42, with the halves being always parallel to each other. An annular flange 54 is fastened to plunger 44 adjacent end 56, this end being adapted to be carried by chain E.

The operation of the machine is as follows:

Halves 40 and 42 of the mandrel are first assembled and then wrapped with loose sheets comprising the layers H of the material to be molded which, as illustrated in Figs. 10 and 11, may consist of layers of thermoplastic sheets alternated with sheets of paper and/or metal foil. The paper and/or foil may be coextensive with the thermoplastic sheets, but in the form illustrated the paper and/or foil terminates short of the projection 46 so that the threaded neck portion of the tube will be formed of the thermoplastic material alone. It is desirable to have the thermoplastic material extending beyond the projection 46 in order to provide an excess of material to ensure that the threaded neck will be fully formed. Sheets of cellulosic material are satisfactory for the thermoplastic layers, and when paper is used for the intermediate layers it may be coated or impregnated with resin to make it impervious to moisture.

The mandrel with the layers of material thereon is then inserted into the cylinder 30, and the plunger 44 is loosely inserted into core 48. The mold M thus formed is then placed on chains D and E, the end 38 of cap 34 passing through the first link and bearing against the outer link of the chain, while end 56 of plunger 44 fits in a slot in chain E and bears against the outer link thereof. By a drive, not shown, chains D and E are then moved to the right in Fig. 1, and the mold M is brought into contact with wedge 20. This wedge enters between the end of the mandrel and flange 54 on rod 44 to force the mandrel tightly into cylinder 30 and cap 34. As plunger 44 is held outwardly by wedge 20, the mandrel is not transversely expanded and thus is free to be moved into tight contact with cap 34. This serves to initially shape the neck portion on the tube while the material is still cool.

Further movement of the chains brings the mold into the heating chamber 24 where the thermoplastic material becomes heated in the mold. Rail C, by reason of the pressure of springs 16 adjusted by nuts 18, is forced against chain E which, in turn, forces plunger 44 into core 48 and expands the mandrel transversely. During the passage of the mold through hood 24 and as the heated layers of material become more and more plastic, the pressure of rail C on plunger 44 causes the mandrel to be continually pushed into and expanded within cylinder 30 and cap 34. Additional heat can be directed on cap 34 where the greatest plasticity and molding of the material takes place. It is to be noted that the spring pressure on rail C is progressively increased as the mold travels through the chamber and that the rollers 6 and 12 on rails B and C, respectively, reduce the friction between the chains and the rails created by the high spring pressures used. The tangential contact between the surfaces of enlargements 50 and 52 and core 48 also reduces friction therebetween and thus facilitates the movement of the plunger in the core to expand the mandrel.

At some point within hood 24 and after the layers of material have become plastic, the mold passes over a second wedge 22 similar to wedge 20. This temporarily releases the expanding contact of the plunger in the mandrel and sharply forces the projection 46 further into bore 36 of cap 34 to squeeze the now plastic material fully into molding engagement with the threads in the bore 36. As the mold leaves wedge 22, rail C, with substantially a snap action because of the inherent flexibility of the long, narrow rail, shoves plunger 44 into core 48 to again expand the mandrel under ever increasing pressure. The layers of material are thus molded into a single structure and threads have been molded into the neck portion of the material lying in cap 34.

After leaving hood 24, the chains convey the mold over heat-insulated portions K in the rails through cooling chamber 28, Fig. 2. All the while, spring pressure is maintained on rail C so that no relaxation of the expansion of the mandrel in the molded tube in the mold takes place even though the material may contract while solidifying. This results in a highly polished surface being formed on the molded tube. The ends of the rails are then separated as shown, with a third wedge 26 similar to wedge 20 being located at this point to loosen the plunger 44 in the core of the mandrel. The mold is then taken from the chains, the cap 34 unscrewed simultaneously from cylinder 30 and the now threaded end of the molded tube, the mandrel removed from cylinder 30, and the tube removed from the mandrel ready for use.

It is thus apparent that the machine fulfills the objects of the invention. As compared with complicated metal tube-forming machines, it is inexpensively constructed, while its parts are of simple form with long wearing qualities. While the description has dealt with the passage of but one mold through the machine, it is to be understood that the chains carry a plurality of molds and that the operation of the machine is substantially continuous so that the tubes are rapidly and cheaply molded. In addition, the trueness of shape and highly polished surface on the molded tubes renders them of superior quality. Furthermore, it is obvious that tubes of shapes other than that shown herein can be similarly formed on the machine merely by varying the shape of the mold.

Having now described my invention, I claim:

1. A machine for molding an article from thermoplastic material comprising a mandrel around which sheets of said material are adapted to be wrapped, means enclosing said mandrel for shaping said material in the form of said article, means for conveying the mold formed of said mandrel and enclosing means through a heating unit and then through a cooling unit, means for expanding said mandrel in said enclosing means, means for forcing said mandrel without expansion into said enclosing means prior to entry of said mold into said heating unit, means for actuating said expanding means while said mold passes through said heating unit, further means for forcing said mandrel without expansion into said enclosing means while said mold passes through said heating unit, and means relaxing the expansion of said mandrel after said mold leaves said cooling unit.

2. A machine for forming articles of thermoplastic material comprising a pair of spaced conveying chains, a fixed guide rail for one chain, a floating guide rail for the other chain, a plurality of molds extending between and carried by said chains, and means for applying pressure against said floating rail.

3. A machine as in claim 2, said means comprising a fixed support substantially parallel to said floating rail, and a plurality of adjustable springs extending between said support and said floating rail.

4. A machine for molding articles of thermoplastic material comprising, in combination, a cylinder one end of which is closed, a longitudinally divided rigid mandrel within the cylinder, a member within the mandrel, said member and mandrel having cooperating means for radially expanding the mandrel when the member is moved axially of the mandrel, means for acting upon the end of the mandrel to move it longitudinally toward the closed end of the cylinder, and means for thereafter acting upon said member to move it axially so as to cause expansion of the mandrel.

5. A machine for molding articles of thermoplastic material comprising, in combination, a cylinder one end of which is closed, a longitudinally divided rigid mandrel within the cylinder, a member within the mandrel for radially expanding the mandrel when the member is moved axially of the mandrel, means for acting upon the end of the mandrel to move it longitudinally toward the closed end of the mandrel, and means for thereafter acting upon said member to move it axially so as to cause expansion and further longitudinal movement of the mandrel.

6. The combination set forth in claim 4 in which the mandrel and member protrude from the open end of the cylinder, the first mentioned means is adapted to act upon the protruding mandrel and the last mentioned means is adapted to act upon the protruding portion of said member.

7. A machine for molding articles of thermoplastic material comprising, in combination, a conveyor for advancing molds along a predetermined pathway, a mold mounted on the conveyor for movement therewith, said mold including an outer open-ended barrel, a longitudinally split mandrel within the barrel and a mandrel-expanding member within the mandrel, said member and mandrel having cooperating means thereon for radially expanding the mandrel when the member is moved axially of the mandrel, means positioned adjacent the path of movement of the mold for successively acting upon the mandrel and mandrel-expanding member, to first move the mandrel longitudinally of the barrel and to thereafter move said mandrel-expanding member longitudinally of the barrel to cause mandrel expansion.

8. The combination set forth in claim 7 in which said means includes a stationary wedge device for engaging the mandrel and a guide rail, with associated yielding support, for acting upon said member.

9. A mold for forming articles of thermoplastic material comprising a cylinder, a longitudinally split hollow mandrel within the cylinder the inner wall of which is provided with spaced conical surfaces centered on the mandrel axis, and a mandrel-operating plunger, said plunger having a plurality of spherical portions which make line contact with the conical inner surfaces of the mandrel, relative longitudinal movement of the mandrel and plunger effecting expansion of the mandrel.

JOHN PAUL RATAY.